(12) United States Patent
Iwama et al.

(10) Patent No.: US 9,677,012 B2
(45) Date of Patent: *Jun. 13, 2017

(54) METHOD FOR PRODUCING LUBRICANT BASE OIL

(71) Applicant: JX NIPPON OIL & ENERGY CORPORATION, Tokyo (JP)

(72) Inventors: Marie Iwama, Tokyo (JP); Kazuaki Hayasaka, Tokyo (JP); Yoshiyuki Nagayasu, Tokyo (JP)

(73) Assignee: JX NIPPON OIL & ENERGY CORPORATION, Tokyo (JP)

(*) Notice: Subject to any disclaimer, the term of this patent is extended or adjusted under 35 U.S.C. 154(b) by 190 days.

This patent is subject to a terminal disclaimer.

(21) Appl. No.: 14/388,548

(22) PCT Filed: Mar. 29, 2013

(86) PCT No.: PCT/JP2013/059652
§ 371 (c)(1),
(2) Date: Sep. 26, 2014

(87) PCT Pub. No.: WO2013/147211
PCT Pub. Date: Oct. 3, 2013

(65) Prior Publication Data
US 2015/0094505 A1    Apr. 2, 2015

(30) Foreign Application Priority Data

Mar. 30, 2012 (JP) ................................ 2012-082342

(51) Int. Cl.
| | | |
|---|---|---|
| *C10G 45/58* | (2006.01) | |
| *C10G 45/64* | (2006.01) | |
| *C10G 45/62* | (2006.01) | |
| *B01J 29/068* | (2006.01) | |
| *C10M 177/00* | (2006.01) | |
| *C10M 101/02* | (2006.01) | |
| *C10G 71/00* | (2006.01) | |

(52) U.S. Cl.
CPC ............ *C10G 45/58* (2013.01); *B01J 29/068* (2013.01); *C10G 45/62* (2013.01); *C10G 45/64* (2013.01); *C10G 71/00* (2013.01); *C10M 101/02* (2013.01); *C10M 101/025* (2013.01); *C10M 177/00* (2013.01); *B01J 2229/42* (2013.01); *C10G 2300/301* (2013.01); *C10M 2203/065* (2013.01); *C10N 2220/021* (2013.01); *C10N 2270/00* (2013.01)

(58) Field of Classification Search
CPC ............... B01J 29/061; B01J 29/068; C10G 2300/1022; C10G 45/58; C10G 45/64; C10G 47/12; C10G 65/14; C10G 69/02; C10G 67/04; C10M 101/02; C10M 2203/1006
See application file for complete search history.

(56) References Cited

U.S. PATENT DOCUMENTS

| | | | |
|---|---|---|---|
| 7,282,137 B2 | 10/2007 | Cody et al. | |
| 2004/0108249 A1 | 6/2004 | Cody et al. | |
| 2007/0272592 A1 | 11/2007 | Germaine et al. | |
| 2008/0156697 A1* | 7/2008 | Dierickx | C10G 65/14 208/79 |
| 2009/0159492 A1 | 6/2009 | Duhoux et al. | |
| 2011/0042267 A1* | 2/2011 | Hayasaka | B01J 29/064 208/27 |

FOREIGN PATENT DOCUMENTS

| | | |
|---|---|---|
| CN | 101044226 | 9/2007 |
| JP | 2006-502297 | 1/2006 |
| JP | 2008-503629 | 2/2008 |
| JP | 2011-068728 | 4/2011 |
| KR | 10-2007-0026837 A | 3/2007 |
| KR | 1020100127771 | 12/2010 |
| WO | 2009/099111 | 8/2009 |

OTHER PUBLICATIONS

English translation of International Search Report of Patent Application No. PCT/JP2013/059652 mailed Jun. 25, 2013.
Office Action for Chinese Patent Application No. 201380017196.9, dated Jun. 26, 2015.
English Translation of the International Preliminary Report of Patentability for Application No. PCT/2013/059652, which was mailed Oct. 9, 2014.
Korean Notice of Allowance issued with respect to application No. 10-2014-7026915, mail date is Sep. 23, 2016.

* cited by examiner

*Primary Examiner* — Renee Robinson
*Assistant Examiner* — Derek Mueller
(74) *Attorney, Agent, or Firm* — Greenblum and Bernstein, P.L.C.

(57) ABSTRACT

A method for producing a lubricant base oil that has a predetermined boiling point range, the method including a first step of bringing a feedstock containing a first hydrocarbon oil having a boiling point in the above boiling point range and a second hydrocarbon oil having a lower boiling point than the boiling point range into contact with a hydroisomerization catalyst, wherein the catalyst contains a support that includes a zeolite having a one-dimensional porous structure including a 10-membered ring and a binder, and platinum and/or palladium supported on the support.

5 Claims, No Drawings

METHOD FOR PRODUCING LUBRICANT BASE OIL

TECHNICAL FIELD

The present invention relates to a method for producing a lubricant base oil.

BACKGROUND ART

Among petroleum products, for example, lubricant, gas oil, and jet fuel are products in which importance is placed on cold flow property. Consequently, it is desirable that the base oil used for these products is such that its wax component, such as a normal paraffin or a slightly branched isoparaffin, which is a factor in deterioration of cold flow property, has been completely or partially removed, or converted into a component other than a wax component.

An example of a known dewaxing technique for removing the wax component from a hydrocarbon oil is a method in which the wax component is extracted using a solvent such as liquefied propane or MEK. However, this method suffers from the problem which is that not only are operational costs high, but the production yield decreases due to wax removal As a method for improving the lubricant base oil yield, so-called isomerization and dewaxing techniques, which convert the wax component in a hydrocarbon oil into a non-wax component by a catalyst from the above-described solvent dewaxing method are widely known.

On the other hand, an example of a known dewaxing technique for converting the wax component in a hydrocarbon oil into a non-wax component is isomerization and dewaxing, in which the hydrocarbon oil is brought into contact with, in the presence of hydrogen, a bifunctional hydroisomerization catalyst capable of hydrogenation-dehydrogenation and isomerization, thereby isomerizing normal paraffins in the hydrocarbon oil to isoparaffins (e.g., Patent Literature 1).

CITATION LIST

Patent Literature

Patent Literature 1: National Publication of International Patent Application No. 2006-502297

SUMMARY OF INVENTION

Technical Problem

While isomerization and dewaxing is a very effective method for improving the cold flow property of hydrocarbon oils, it is necessary to sufficiently increase the conversion rate of the normal paraffins in order to obtain a fraction that is suitable as a lubricant base oil or a fuel base oil. However, because the hydroisomerization catalysts used in isomerization and dewaxing are capable of both isomerization and hydrocarbon cracking, when performing isomerization and dewaxing of the hydrocarbon oil, the conversion of the hydrocarbon oil into lighter products also proceeds as the conversion rate of the normal paraffins increases, so that this technique can be said to need for further improvement.

There are many types of products that use a lubricant base oil based on intended usage. Since the low-temperature performance and viscosity properties required by each product are different for each feedstock type, during isomerization and dewaxing it is common to individually subject feedstocks for the respective products that have been fractionated by distillation in advance to an isomerization and dewaxing treatment at the optimum reaction temperature for each feedstock type.

In a method in which fractionation is performed for each feedstock type and an isomerization and dewaxing treatment is individually performed for each fraction, distillation equipment for the feedstock is required at the stage before the feedstock flows to the isomerization and dewaxing reactor. In addition, cost increases in terms of equipment because, for example, a tank for storing a distilled feedstock is required for each feedstock type. Further, in order to individually carry out isomerization and dewaxing on each distilled feedstock, there is also a negative effect in terms of the opportunity loss that arises because of the time that it takes to switch the feedstock.

However, conversely, the problem is that if the target fraction is subjected to the isomerization and dewaxing treatment without fractionation even into other fractions, it is difficult to achieve both sufficient dewaxing and a high yield for the target fraction due to the hydrocracking that occurs simultaneously with the isomerization and dewaxing.

Accordingly, the present invention provides a method for producing a lubricant base oil capable of achieving both sufficient dewaxing and a high yield while subjecting a target fraction to an isomerization and dewaxing treatment without fractionation even into other fractions.

Solution to Problem

The method for producing a lubricant base oil according to the present invention is a method for producing a lubricant base oil that has a predetermined boiling point range, which includes a first step of, in the presence of hydrogen, bringing a feedstock containing a first hydrocarbon oil having a boiling point in the above boiling point range and a second hydrocarbon oil having a lower boiling point than the above boiling point range into contact with a hydroisomerization catalyst. Further, in the method for producing a lubricant base oil according to the present invention, the catalyst contains a support that includes a zeolite having a one-dimensional porous structure including a 10-membered ring and a binder, and platinum and/or palladium supported on the support, wherein the carbon content of the catalyst is 0.4 to 3.5% by mass, and the micropore volume per unit mass of the catalyst is 0.02 to 0.12 cc/g. Further, the zeolite is derived from an ion-exchanged zeolite obtained by ion-exchanging an organic template-containing zeolite that contains an organic template and has a one-dimensional porous structure including a 10-membered ring in a solution containing ammonium ions and/or protons, in which the micropore volume per unit mass of the zeolite contained in the catalyst is 0.01 to 0.12 cc/g.

In the present invention, by using the above-specified hydroisomerization catalyst, and, subjecting the first hydrocarbon oil, which is the target fraction, to the isomerization and dewaxing treatment without separating from the second hydrocarbon oil, compared with when an isomerization and dewaxing treatment is performed on the first hydrocarbon oil alone by fractionating the first hydrocarbon oil, a lubricant base oil can be obtained at a higher yield. Specifically, according to the present invention, yield can be improved more than when performing an isomerization and dewaxing treatment individually for each fraction, and in terms of equipment and operation, cost reductions can be realized.

One reason for the above advantageous effects being obtained by the present invention is thought to be that since the feedstock contains a second hydrocarbon oil, the kinematic viscosity of the feedstock is lower than the kinematic viscosity of the first hydrocarbon oil alone, so that feedstock drift and the like is prevented.

In the present invention, the content of the first hydrocarbon oil in the hydrocarbon oil can be set at 5 to 60% by volume based on the total amount of feedstock.

In one aspect of the present invention, the boiling point range of the first hydrocarbon oil may be 520° C. or more, and the boiling point range of the second hydrocarbon oil may be 330° C. or more and less than 520° C.

In another aspect of the present invention, the boiling point range of the first hydrocarbon oil may be 470° C. or more and less than 520° C., and the boiling point range of the second hydrocarbon oil may be 330° C. or more and less than 470° C.

The method for producing a lubricant base oil according to the present invention may, in addition to the first step, further include a second step of obtaining a hydrorefined oil by hydrorefining the dewaxed oil obtained in the first step, and a third step of fractionating a base oil fraction having the above boiling point range from the hydrorefined oil.

Advantageous Effects of Invention

According to the present invention, provided is a method for producing a lubricant base oil capable of achieving both sufficient dewaxing and a high yield while subjecting a target fraction to a isomerization and dewaxing treatment without fractionation even into other fractions.

DESCRIPTION OF EMBODIMENTS

Preferred embodiments of the present invention will now be described.

The method for producing a lubricant base oil according to the present embodiment is a method for producing a lubricant base oil that has a predetermined boiling point range, which includes a first step of, in the presence of hydrogen, bringing a feedstock containing a first hydrocarbon oil having a boiling point in the above boiling point range and a second hydrocarbon oil having a lower boiling point than the above boiling point range into contact with a hydroisomerization catalyst.

In the present embodiment, the hydroisomerization catalyst contains a support that includes a zeolite having a one-dimensional porous structure including a 10-membered ring and a binder, and platinum and/or palladium supported on the support. The carbon content of the hydroisomerization catalyst is 0.4 to 3.5% by mass, and the micropore volume per unit mass of the hydroisomerization catalyst is 0.02 to 0.12 cc/g. Further, the zeolite is derived from an ion-exchanged zeolite obtained by ion-exchanging an organic template-containing zeolite that contains an organic template and has a one-dimensional porous structure including a 10-membered ring in a solution containing ammonium ions and/or protons, in which the micropore volume per unit mass of the zeolite contained in the catalyst is 0.01 to 0.12 cc/g. The carbon content of the hydroisomerization catalyst is measured by "combustion in oxygen gas flow—infrared absorption method". Specifically, the catalyst is combusted in the oxygen gas flow to generate carbon dioxide gas and the carbon content is determined based on an infrared absorption amount of the carbon dioxide gas. Analysis equipments for carbon—sulfur (for example, EMIA-920V manufactured by HORIBA, Ltd.) are used for the measurement.

In the present specification, the micropore volume per unit mass of the hydroisomerization catalyst is calculated by a method called nitrogen adsorption measurement. Namely, for the catalyst, the micropore volume per unit mass of the catalyst is calculated by analyzing a physical adsorption-desorption isotherm of nitrogen measured at the temperature of liquid nitrogen (−196° C.), specifically, analyzing an adsorption isotherm of nitrogen measured at the temperature of liquid nitrogen (−196° C.) by a t-plot method. Further, the micropore volume per unit mass of the zeolite contained in the catalyst is also calculated by the above-described nitrogen adsorption measurement.

The term "micropore" in the present specification refers to "pores having a diameter of 2 nm or less" as stipulated by the IUPAC (the International Union of Pure and Applied Chemistry).

In the present embodiment, by using such a hydroisomerization catalyst, and, subjecting the first hydrocarbon oil, which is the target fraction, to the isomerization and dewaxing treatment without separating from the second hydrocarbon oil, compared with when an isomerization and dewaxing treatment is performed on the first hydrocarbon oil alone by fractionating the first hydrocarbon oil, a lubricant base oil can be obtained at a higher yield. Specifically, according to the production method of the present embodiment, yield can be improved more than when performing an isomerization and dewaxing treatment individually for each fraction, and in terms of equipment and operation, cost reductions can be realized.

<Hydroisomerization Catalyst>

The hydroisomerization catalyst according to the present embodiment can be imparted with its characteristics as a result of being produced by a specific method. The hydroisomerization catalyst will now be described with reference to a preferred production aspect thereof.

The method for producing a hydroisomerization catalyst according to the present embodiment includes a first step of obtaining a support precursor by heating a mixture that includes an ion-exchanged zeolite obtained by ion-exchanging an organic template-containing zeolite that contains an organic template and has a one-dimensional porous structure including a 10-membered ring in a solution containing ammonium ions and/or protons, and a binder, in a $N_2$ atmosphere at a temperature of 250 to 350° C., and a second step of obtaining a hydroisomerization catalyst in which platinum and/or palladium is supported on a support including zeolite by calcining a catalyst precursor incorporating a platinum salt and/or palladium salt in the support precursor in an atmosphere containing molecular oxygen at a temperature of 350 to 400° C.

From the perspective of achieving a high level of both high isomerization activity and suppressed cracking activity in the hydroisomerization reactions of normal paraffins, the organic template-containing zeolite used in the present embodiment has a one-dimensional pore structure formed from a 10-membered ring. Examples of such zeolites include AEL, EUO, FER, HEU, MEL, MEI, NES, TON, MTT, WEI, *MRE, and SSZ-32. The above three-lettered acronyms represent framework-type codes assigned to various structures of classified molecular sieve-type zeolites by the Structure Commission of the International Zeolite Association. It is also noted that zeolites having the same topology are collectively designated by the same code.

Among the above-described zeolites having a one-dimensional porous structure including a 10-membered ring, from the perspective of high isomerization activity and low cracking activity, preferred as the organic template-containing zeolite are zeolites having a TON or an MTT structure, zeolite ZSM-48, which is zeolite having a *MRE structure, and zeolite SSZ-32. Zeolite ZSM-22 is more preferred among zeolites having the TON structure, and zeolite ZSM-23 is more preferred among zeolites having the MTT structure.

The organic template-containing zeolite is hydrothermally synthesized according to a known method from a silica source, an alumina source, and an organic template that is added to build the above-described predetermined pore structure.

The organic template is an organic compound having an amino group, an ammonium group, and the like, and is selected according to the structure of the zeolite to be synthesized. However, it is preferred that the organic template is an amine derivative. Specifically, the organic template is preferably at least one selected from the group consisting of alkylamines, alkyldiamines, alkyltriamines, alkyltetramines, pyrrolidine, piperazine, aminopiperazine, alkylpentamines, alkylhexamines, and their derivatives. The carbon number of above alkyl group may be 4 to 10, preferably 6 to 8. Typical examples of the alkyldiamines include 1,6-hexanediamine and 1,8-diaminooctane.

The molar ratio of the silicon element to aluminum element ([Si]/[Al]; hereinafter referred to as a "Si/Al ratio") that constitute the organic template-containing zeolite having a one-dimensional porous structure including a 10-membered ring is preferably 10 to 400, and more preferably 20 to 350. If the Si/Al ratio is less than 10, although the activity for the conversion of normal paraffins increases, the isomerization selectivity to isoparaffins tends to decrease, and cracking reactions caused by an increase in the reaction temperature tend to sharply increase, which is undesirable. Conversely, if the Si/Al ratio is more than 400, the catalytic activity needed for the conversion of normal paraffins cannot be easily obtained, which is undesirable.

The synthesized organic template-containing zeolite, which has preferably been washed and dried, typically has alkali metal cations as counter cations, and incorporates the organic template in its pore structure. The zeolite containing an organic template, which is used for producing the hydroisomerization catalyst, is preferably in such a synthesized state, i.e., preferably, the zeolite has not been subjected to a calcining treatment for removing the organic template incorporated therein.

The organic template-containing zeolite is next ion-exchanged in a solution containing ammonium ions and/or protons. By the ion-exchange treatment, the counter cations contained in the organic template-containing zeolite are exchanged for ammonium ions and/or protons. Further, at the same time, a portion of the organic template incorporated in the organic template-containing zeolite is removed.

The solution used for the ion-exchange treatment is preferably a solution that uses a solvent containing at least 50% by volume of water, and more preferably is an aqueous solution. Examples of compounds for supplying ammonium ions into the solution include various inorganic and organic ammonium salts, such as ammonium chloride, ammonium sulfate, ammonium nitrate, ammonium phosphate, and ammonium acetate. On the other hand, mineral acids such as hydrochloric acid, sulfuric acid, and nitric acid are typically used as compounds for supplying protons into the solution. The ion-exchanged zeolite (here, an ammonium-form zeolite) obtained by ion exchange of the organic template-containing zeolite in the presence of ammonium ions releases ammonia during subsequent calcination, and the counter cations are converted into protons to form Bronsted acid sites. Ammonium ions are preferred as the cationic species used for the ion exchange. The amount of ammonium ions and/or protons contained in the solution is preferably set to 10 to 1,000 equivalents based on the total amount of the counter cations and organic template contained in the organic template-containing zeolite used.

The ion-exchange treatment may be performed on the organic template-containing zeolite support in powder form, or alternatively, prior to the ion-exchange treatment, the organic template-containing zeolite may be blended with an inorganic oxide, which is a binder, and extruded, and the ion-exchange treatment may be performed on the resulting extruded body. However, if the extruded body is subjected to the ion-exchange treatment in an uncalcined state, problems such as the extruded body collapsing and turning into a powder tend to occur. Therefore, it is preferred to subject the organic template-containing zeolite in powder form to an ion-exchange treatment.

The ion-exchange treatment is preferably performed based on a standard method, i.e., a method in which the zeolite containing an organic template is dipped in a solution, preferably an aqueous solution, containing ammonium ions and/or protons, and the solution is stirred or fluidized. It is preferred to perform the stirring or fluidization under heating to increase the ion-exchange efficiency. In the present embodiment, it is especially preferred to use a method in which the aqueous solution is heated, boiled, and ion-exchanged under reflux.

Further, from the perspective of increasing the ion-exchange efficiency, during the ion exchange of the zeolite in a solution, it is preferred to exchange the solution with a fresh one once or twice or more, and more preferably exchanged with a fresh one once or twice. When exchanging the solution once, the ion-exchange efficiency can be improved by, for example, dipping the organic template-containing zeolite in a solution containing ammonium ions and/or protons, and heating the solution under reflux for 1 to 6 hours, followed by exchanging the solution with a fresh one, and further heating under reflux for 6 to 12 hours.

By the ion-exchange treatment, substantially all of the counter cations such as an alkali metal in the zeolite can be exchanged for ammonium ions and/or protons. On the other hand, regarding the organic template incorporated in the zeolite, although a portion of the organic template is removed by the ion-exchange treatment, it is generally difficult to remove all of the organic template even if the ion-exchange treatment is repeatedly performed, so that a portion of the organic template remains inside the zeolite.

In the present embodiment, a support precursor is obtained by heating a mixture in which the ion-exchanged zeolite and the binder are included in a nitrogen atmosphere at a temperature of 250 to 350° C.

The mixture in which the ion-exchanged zeolite and the binder are included is preferably obtained by blending an inorganic oxide, which is a binder, with the ion-exchanged zeolite obtained by the above-described method, and extruding the resulting composition to form a extruded body. The purpose of blending an inorganic oxide with the ion-exchanged zeolite is to increase the mechanical strength of the support (in particular, a particulate support) obtained by calcining the extruded body to a degree that can withstand practical applications. However, the present inventor found that the selection of the type of inorganic oxide affects the isomerization selectivity of the hydroisomerization catalyst. From this perspective, at least one inorganic oxide selected from alumina, silica, titania, boria, zirconia, magnesia, ceria, zinc oxide, phosphorus oxide, and a composite oxide containing a combination of two or more of these oxides can be used as the inorganic oxide. Among the above, silica and alumina are preferred, and alumina is more preferred, from the perspective of further improving the isomerization selectivity of the hydroisomerization catalyst. The phrase "composite oxide containing a combination of two or more of these oxides" refers to a composite oxide containing at least two components from alumina, silica, titania, boria, zirconia, magnesia, ceria, zinc oxide, and phosphorus oxide, but is preferably an alumina-based composite oxide containing 50% by mass or more of an alumina component based on the composite oxide, and among those, is more preferably alumina-silica.

The blending ratio of the ion-exchanged zeolite and the inorganic oxide in the above-described composition is preferably 10:90 to 90:10, and more preferably 30:70 to 85:15, in teens of the mass ratio of the ion-exchanged zeolite to the inorganic oxide. If this ratio is less than 10:90, the activity of the hydroisomerization catalyst tends to be insufficient, which is undesirable. Conversely, if the ratio is more than 90:10, the mechanical strength of the support obtained by extruding and calcining the composition tends to be insufficient, which is undesirable.

Although the method for blending the inorganic oxide with the ion-exchanged zeolite is not especially limited, a general method can be employed, such as, for example, a method in which a suitable amount of a liquid such as water is added to the powders of both components to form a viscous fluid, and the fluid is kneaded in a kneader or the like.

The composition containing the ion-exchanged zeolite and inorganic oxide, or a viscous fluid including the composition, is extruded by a method such as extrusion, and is preferably dried, to form a particulate extruded body. Although the shape of the extruded body is not especially limited, examples of the shape include a cylindrical shape, a pellet shape, a spherical shape, and an irregular tubular shape having a three leaf shaped or a four leaf shaped cross-section. Although the size of the extruded body is not especially limited, the extruded body is preferably, for example, about 1 to 30 mm in the long axis, and about 1 to 20 mm in the short axis, from the perspective of the ease of handling, the load density in the reactor, and the like.

In the present embodiment, it is preferred to form the support precursor by heating the thus-obtained extruded body in a $N_2$ atmosphere at a temperature of 250 to 350° C. Regarding the heating time, preferred is 0.5 to 10 hours, and more preferred is 1 to 5 hours.

In the present embodiment, if the above-described heating temperature is less than 250° C., a large amount of organic template remains, and the zeolite pores become blocked with the remaining template. The isomerization active sites are thought to exist near the pore mouth. Thus, in the above case, the reaction substrate cannot disperse into the pores due to the pore blockage, so that the active sites become covered, the isomerization reaction does not easily proceed, and the conversion rate of the normal paraffins tends not to be sufficiently obtained. On the other hand, if the heating temperature is more than 350° C., the isomerization selectivity of the obtained isomerization catalyst does not sufficiently improve.

It is preferred that the lower limit for the temperature when forming the support precursor by heating the extruded body is 280° C. or more, and that the upper limit for the temperature is 330° C. or less.

In the present embodiment, it is preferred to heat the above-described mixture so that a portion of the organic template included in the extruded body remains. Specifically, it is preferred to set the heating conditions so that the carbon content of the hydroisomerization catalyst obtained by calcination after metal supporting, which will be described below, is 0.4 to 3.5% by mass (preferably 0.4 to 3.0% by mass, more preferably 0.4 to 2.5% by mass), the micropore volume per unit mass of that catalyst is 0.02 to 0.12 cc/g, and the micropore volume per unit mass of the zeolite that is contained in that catalyst is 0.01 to 0.12 cc/g.

Next, the catalyst precursor incorporating a platinum salt and/or palladium salt in the above-described support precursor is calcined in an atmosphere containing molecular oxygen at a temperature of 350 to 400° C., preferably 380 to 400° C., and more preferably 400° C., to obtain a hydroisomerization catalyst in which platinum and/or palladium is supported on a support including zeolite. Here, "in an atmosphere containing molecular oxygen" means bringing into contact with a gas including oxygen gas, and of those preferably air. The calcining time is preferably 0.5 to 10 hours, and more preferably 1 to 5 hours.

Examples of the platinum salt include chloroplatinic acid, tetraammineplatinum dinitrate, and dinitroaminoplatinum, tetraamminedichloroplatinum. Since chloride salts can produce hydrochloric acid during a reaction, which may cause apparatus corrosion, tetraammineplatinum dinitrate, which is a platinum salt that is not a chloride acid and in which a high level of platinum is dispersed, is preferred.

Examples of the palladium salt include palladium chloride, tetraammine palladium nitrate, and diaminopalladium nitrate. Since chloride salts can produce hydrochloric acid during a reaction, which may cause apparatus corrosion, tetraammine palladium nitrate, which is a palladium salt that is not a chloride salt and in which a high level of palladium is dispersed, is preferred.

The amount of the active metal supported on the support including zeolite according to the present embodiment is preferably 0.001 to 20% by mass, and more preferably 0.01 to 5% by mass, based on the mass of the support. If the amount supported is less than 0.001% by mass, it is difficult to impart a predetermined hydrogenation/dehydrogenation function to the catalyst. Conversely, if the amount supported is more than 20% by mass, conversion on the active metal of hydrocarbons into lighter products by cracking tends to proceed, so that the yield of the intended fraction tends to decrease, and the catalyst costs tend to increase, which are undesirable.

Further, when the hydroisomerization catalyst according to the present embodiment is used for hydroisomerization of a hydrocarbon oil containing many sulfur-containing compounds and/or nitrogen-containing compounds, from the perspective of the durability of catalytic activity, it is preferred that the active metals are a combination such as nickel-cobalt, nickel-molybdenum, cobalt-molybdenum, nickel-molybdenum-cobalt, or nickel-tungsten-cobalt. It is preferred that the amount of these metals supported is 0.001 to 50% by mass, and more preferably 0.01 to 30% by mass, based on the mass of the support.

In the present embodiment, it is preferred to calcine the above-described catalyst precursor so that the organic template remaining in the support precursor remains. Specifically, it is preferred to set the heating conditions so that the carbon content of the obtained hydroisomerization catalyst is 0.4 to 3.5% by mass (preferably 0.4 to 3.0% by mass, more preferably 0.4 to 2.5% by mass), the micropore volume per unit mass of the obtained hydroisomerization catalyst is 0.02 to 0.12 cc/g, and the micropore volume per unit mass of the zeolite that is contained in that catalyst is 0.01 to 0.12 cc/g. The carbon content of the hydroisomerization catalyst is measured by "combustion in oxygen gas flow—infrared absorption method". Specifically, the catalyst is combusted in the oxygen gas flow to generate carbon dioxide gas and the carbon content is determined based on an infrared absorption amount of the carbon dioxide gas. Analysis equipments for carbon—sulfur (for example, EMIA-920V manufactured by HORIBA, Ltd.) are used for the measurement.

The micropore volume per unit mass of the hydroisomerization catalyst is calculated by a method called nitrogen adsorption measurement. Namely, for the catalyst, the micropore volume per unit mass of the catalyst is calculated by analyzing a physical adsorption-desorption isotherm of nitrogen measured at the temperature of liquid nitrogen (−196° C.), specifically, analyzing an adsorption isotherm of nitrogen measured at the temperature of liquid nitrogen (−196° C.) by a t-plot method. Further, the micropore volume per unit mass of the zeolite contained in the catalyst is also calculated by the above-described nitrogen adsorption measurement.

A micropore volume $V_z$ per unit mass of the zeolite contained in the catalyst can be calculated, for example, if the binder does not have a micropore volume, based on the following expression from a value $V_c$ of the micropore volume per unit mass of the hydroisomerization catalyst and the content $M_z$ (% by mass) of zeolite in the catalyst.

$$V_z = V_c / M_z \times 100$$

It is preferred that, subsequent to the calcination treatment, the hydroisomerization catalyst is subjected to a reduction treatment after the catalyst is preferably loaded in the reactor for conducting the hydroisomerization reaction. Specifically, it is preferred to perform the reduction treatment for about 0.5 to 5 hours in an atmosphere containing molecular hydrogen, and preferably under a stream of hydrogen gas, preferably at 250 to 500° C., and more preferably at 300 to 400° C. By performing this step, it can be further ensured that high activity for the dewaxing of the hydrocarbon oil can be imparted to the catalyst.

The hydroisomerization catalyst is, in one aspect, a hydroisomerization catalyst containing a support that includes a zeolite having a one-dimensional porous structure including a 10-membered ring and a binder, and platinum and/or palladium supported on the support, in which the carbon content of the catalyst is 0.4 to 3.5% by mass and the micropore volume per unit mass of the catalyst is 0.02 to 0.12 cc/g. Further, the zeolite is zeolite derived from an ion-exchanged zeolite obtained by ion-exchanging an organic template-containing zeolite that contains an organic template and has a one-dimensional porous structure including a 10-membered ring in a solution containing ammonium ions and/or protons, in which the micropore volume per unit mass of the zeolite contained in the catalyst is 0.01 to 0.12 cc/g.

The above-described hydroisomerization catalyst can be produced by the method described above. The micropore volume per unit mass of the catalyst and the micropore volume per unit mass of the zeolite contained in the catalyst can be set to be within the above-described ranges by appropriately adjusting the amount of an ion-exchanged zeolite blended in the mixture including the ion-exchanged zeolite and a binder, the heating conditions of the mixture in a $N_2$ atmosphere, and the heating conditions of the catalyst precursor in the atmosphere containing molecular oxygen.

<Lubricant Base Oil Production Method>

The method for producing a lubricant base oil according to the present embodiment is a method for producing a lubricant base oil having a predetermined boiling point range, which includes a first step of, in the presence of hydrogen, bringing a feedstock containing a first hydrocarbon oil having a boiling point in the above boiling point range and a second hydrocarbon oil having a lower boiling point than the above boiling point range into contact with the above-described hydroisomerization catalyst (hereinafter sometimes referred to as a "dewaxing step"). In the first step, isomerization and dewaxing of the feedstock is performed by bringing the feedstock into contact with a hydroisomerization catalyst.

The expression "boiling point range is $X_1°$ C. or more" in the present specification indicates that the initial boiling point and the final boiling point are both $X_1°$ C. or more. The expression "boiling point range is $X_2°$ C. or more and less than $X_3°$ C." indicates that the initial boiling point and the final boiling point are both in the range of $X_2°$ C. or more and less than $X_3°$ C.

The first hydrocarbon oil is a hydrocarbon oil having a boiling point in a boiling point range of the desired lubricant base oil, and contains normal paraffins having a boiling point in that boiling point range. The first hydrocarbon oil can be said to be a fraction that has the same boiling point range as the boiling point range of the desired lubricant base oil.

The content of the first hydrocarbon oil in the feedstock is, based on the total amount of the feedstock, preferably 5 to 60% by volume, more preferably 5 to 45% by volume, and even more preferably 10 to 40% by volume.

The second hydrocarbon oil is a hydrocarbon oil having a lower boiling point than the boiling point range of the desired lubricant base oil, and contains normal paraffins having a lower boiling point than that boiling point range. The second hydrocarbon oil can be said to be a fraction whose boiling point range upper limit is lower than the boiling point range of the desired lubricant base oil. Although the lower limit of the boiling point range for the second hydrocarbon oil is not especially limited, for example, the lower limit may be 330° C.

The content of the second hydrocarbon oil in the feedstock is, based on the total amount of the feedstock, preferably 40 to 95% by volume, more preferably 55 to 95% by volume, and even more preferably 60 to 90% by volume.

When boiling point range of the desired lubricant base oil has an upper limit, the feedstock may contain a third hydrocarbon oil having a boiling point which is more than that upper limit. The content of the third hydrocarbon oil may be, for example, 5 to 30% by volume, or even 10 to 40% by volume.

For example, if a lubricant base oil having a boiling point range of 520° C. or more is the main target base oil, the boiling point range of the first hydrocarbon oil can be 520° C. or more, and the boiling point range of the second hydrocarbon oil can be 330° C. or more and less than 520° C.

Further, for example, if a lubricant base oil having a boiling point range of 470° C. or more and less than 520° C. is the main target base oil, the boiling point range of the first hydrocarbon oil can be 470° C. or more and less than 520° C., and the boiling point range of the second hydrocarbon oil can be 330° C. or more and less than 470° C.

One reason for the above advantageous effects being obtained by the present invention is thought to be that since the feedstock contains a second hydrocarbon oil, the kinematic viscosity of the feedstock is lower than the kinematic viscosity of the first hydrocarbon oil alone, so that feedstock drift and the like is prevented.

The kinematic viscosity of the feedstock at 100° C. is preferably less than 10.0 mm²/s, and more preferably 8.0 mm²/s or less. The kinematic viscosity of the feedstock can be adjusted based on the content ratio of the first hydrocarbon oil and the second hydrocarbon oil.

In the dewaxing step, a part or all of the normal paraffins included in the feedstock may be converted into an isoparaffin by a hydroisomerization reaction.

In the dewaxing step, it is preferred to bring the feedstock and the hydroisomerization catalyst into contact under conditions in which the conversion rate of the normal paraffins as defined by Expression (I) is essentially 100% by mass.

[Expression 1]

$$\text{Conversion of normal paraffins (\%)} = \left[1 - \frac{\left(\begin{array}{c}\text{Total mass \% of normal paraffins having} \\ \text{Cn or more carbon atoms contained} \\ \text{in a hydrocarbon oil after the contact}\end{array}\right)}{\left(\begin{array}{c}\text{Total mass \% of normal paraffins having} \\ \text{Cn or more carbon atoms contained} \\ \text{in the hydrocarbon oil before the contact}\end{array}\right)}\right] \times 100 \quad (I)$$

In Expression (I), Cn represents the lowest carbon atom number among the normal paraffins having 10 or more carbon atoms that are included in the hydrocarbon oil (feedstock) before the contact.

The expression "conversion rate is essentially 100% by mass" means that the content of normal paraffins included in the hydrocarbon oil after the contact is 0.1% by mass or less.

As the feedstock, preferred are petroleum fractions, synthetic oils and waxes, and the like that are fractions having boiling points of more than 330° C. as calculated at atmospheric pressure. Specific examples of feedstocks include atmospheric residual oil, heavy gas oil, vacuum residual oil, vacuum gas oil, lubricant raffinate, bright stock, slack wax (crude wax), foot's oil, deoiled wax, paraffinic wax, microcrystalline wax, petrolatum, synthetic oils, FT synthetic oil, FT synthesis wax, high-pour-point polyolefins, and straight-chain α-olefin waxes. It is especially preferred to use atmospheric residual oil, vacuum gas oil, vacuum residual oil, slack wax, FT synthetic oil, and FT synthesis wax. These can be used singly or in combinations of two or more. Further, these feedstocks have preferably been hydrotreated or lightly hydrocracked. These treatments can reduce or remove substances that cause the activity of the hydroisomerization catalyst to decrease, such as sulfur-containing compounds and nitrogen-containing compounds, and substances that cause the viscosity index of the lubricant base oil to decrease, such as aromatic hydrocarbons and naphthenic hydrocarbons.

By bringing such a feedstock into contact with the above-described hydroisomerization catalyst in the presence of hydrogen, it is possible to make the isomerization of the normal paraffins included in the feedstock, namely, the dewaxing reaction of the feedstock, proceed while sufficiently suppressing the conversion of the feedstock into lighter products. Moreover, according to the dewaxing step of the present embodiment, a base oil including many branched-chain isomers can be obtained. In particular, for a high-quality lubricant base oil, it is required that the content of normal paraffins be 0.1% by mass or less. According to the production method of the present embodiment, a lubricant base oil that meets this level of requirement can be obtained at a high yield.

The reaction temperature of the hydroisomerization reaction in the dewaxing step is preferably 200 to 450° C., and more preferably 220 to 400° C. If the reaction temperature is less than 200° C., the isomerization of the normal paraffins contained in the feedstock does not easily proceed, so that the reduction and removal of the wax component tend to be insufficient. Conversely, if the reaction temperature is more than 450° C., cracking of the hydrocarbon oil is significant, so that the yield of the intended hydrocarbon tends to decrease.

The reaction pressure in the hydroisomerization reaction is preferably 0.1 to 20 MPa, and more preferably 0.5 to 15 MPa. If the reaction pressure is less than 0.1 MPa, catalyst degradation due to the formation of coke tends to be accelerated. Conversely, if the reaction pressure is more than 20 MPa, construction costs for the apparatus increase, so that it tends to become difficult to realize an economical process.

The liquid hourly space velocity of the feedstock based on the catalyst is preferably 0.01 to 100 $h^{-1}$, and more preferably 0.1 to 50 $h^{-1}$. If the liquid hourly space velocity is less than 0.01 $h^{-1}$, the cracking of the feedstock tends to proceed excessively, so that the production efficiency of the intended lubricant base oil tends to decrease. Conversely, if the liquid hourly space velocity is more than 100 the isomerization of the normal paraffins included in the feedstock does not easily proceed, so that the reduction and removal of the wax component tend to be insufficient.

The supply ratio of hydrogen to feedstock is preferably 100 to 1,000 $Nm^3/m^3$, and more preferably 200 to 800 $Nm^3/m^3$. If the supply ratio is less than 100 $Nm^3/m^3$, for example, when the feedstock contains sulfur and nitrogen compounds, hydrogen sulfide and ammonia gas produced by desulfurization and denitrification reactions that accompany the isomerization reaction are adsorbed onto and poison the active metal on the catalyst, which tends to make it difficult to achieve a predetermined catalytic performance. Conversely, if the supply ratio is more than 1,000 $Nm^3/m^3$, hydrogen supply equipment having an increased capacity is required, which tends to make it difficult to realize an economical process.

In the dewaxing step, since it is generally possible to increase the conversion rate of the normal paraffins by, for example, increasing the reaction temperature, to thereby reduce the normal paraffin content in the resulting dewaxed oil, the cold flow property of the hydrocarbon oil can be improved. However, if the reaction temperature is increased, the cracking reactions of the feedstock and the isomerized products are promoted, so that the amount of light fractions increases with the increase in the conversion rate of the normal paraffins. Such an increase in light fractions is a factor in reducing the viscosity index of the hydrocarbon oil. Therefore, in order to maintain performance as a lubricant base oil within a predetermined range, it is necessary to separate and remove these light fractions by distillation or the like. Particularly in the production of high-performance lubricant base oils such as Group II (a viscosity index of 80 or more and less than 120, and a saturated hydrocarbon content of 90% by mass or more, and a sulfur compound content of 0.03% by mass or less), Group III (a viscosity index of 120 or more, and a saturated hydrocarbon content of 90% by mass or more, and a sulfur compound content of 0.03% by mass or less), and Group III+(a viscosity index of 140 or more, and a saturated hydrocarbon content of 90% by mass or more, and a sulfur compound content of 0.03% by mass or less) according to the classification of the lubricant grades prescribed by the American Petroleum Institute (API) by isomerization and dewaxing of the above-described feedstock, it is necessary to increase the conversion rate of normal paraffins in the feedstock to essentially 100%. With conventional methods for producing lubricant base oils using catalysts for isomerization and dewaxing, the yield of the above-mentioned high-performance lubricant base oil is extremely low under conditions that give the conversion rate of normal paraffins of essentially 100%. In contrast, according to the method for producing a lubricant base oil of the present invention, it is possible to maintain the yield of the above-mentioned high-performance lubricant base oil at a high level, even when the hydroisomerization is performed under conditions that give the conversion rate of normal paraffins of essentially 100%.

The equipment for carrying out the method for producing a lubricant base oil according to the present embodiment is not especially limited, and known equipment can be employed. The reaction equipment may be any of a continuous flow-type, a batch-type, and a semi-batch-type. However, a continuous flow-type is preferred from the perspective of productivity and efficiency. The catalyst bed may be any of a fixed bed, a fluidized bed, and a stirred bed. However, a fixed bed is preferred in view of equipment costs and the like. The reaction phase is preferably a mixed phase of gas and liquid.

In the method for producing a lubricant base oil according to the present embodiment, the hydrocarbon oil as a supplied raw material may be hydrotreated or hydrocracked as a stage prior to the dewaxing step. Known equipment, catalysts, and reaction conditions can be used for the hydrotreatment or hydrocracking. By carrying out these pre-treatments, it is possible to maintain the activity of the hydroisomerization catalyst over an extended period of time, and to reduce the amount of substances that place a burden on the environment, such as sulfur- and nitrogen-containing compounds, in the product.

Further, in the method for producing a lubricant base oil according to the present embodiment, the reaction product (dewaxed oil) obtained by subjecting the feedstock to isomerization and dewaxing by bringing the feedstock into contact with a hydroisomerization catalyst, can be further treated by, for example, hydrofinishing. Hydrofinishing can be typically carried out by bringing, in the presence of hydrogen, the product to be finished into contact with a hydrogenation catalyst supported on a metal (e.g., platinum and/or palladium supported on alumina). By performing such hydrofinishing, it is possible to improve the color hue, oxidation stability, and the like of the reaction product obtained in the dewaxing step, thereby enabling the product quality to be improved. The hydrofinishing may be carried out in reaction equipment separate from that of the dewaxing step. Alternatively, a catalyst layer for hydrofinishing may be provided downstream from the catalyst layer of the hydroisomerization catalyst provided in the reactor for performing the dewaxing step, and the hydrofinishing may be performed subsequent to the dewaxing step. Hydrofinishing is also called hydrorefining, and in the following, the hydrofinishing step will be referred to as a hydrorefining step.

Since the feedstock in the present embodiment contains fractions other than the fraction corresponding to the desired lubricant base oil, it is preferred that the method for producing a lubricant base oil according to the present embodiment includes a distillation step of fractionating a base oil fraction having the predetermined boiling point range.

The method for producing a lubricant base oil according to the present embodiment may also further include a hydrorefining step of obtaining a hydrorefined oil by hydrorefining the dewaxed oil obtained in the dewaxing step, and a distillation step of fractionating a base oil fraction having the predetermined boiling point range from the hydrorefined oil obtained in the hydrorefining step.

The method for producing a lubricant base oil according to the present embodiment may also further include a distillation step of fractionating a base oil fraction having the predetermined boiling point range from the dewaxed oil obtained in the first step, and a hydrorefining step of hydrorefining the base oil fraction fractionated in the distillation step.

It is noted that, generally, isomerization refers to a reaction in which only the molecular structure changes without a change in the number of carbon atoms (the molecular weight), and cracking refers to a reaction that involves a decrease in the number of carbon atoms (molecular weight). In isomerization and dewaxing utilizing an isomerization reaction, even if a certain degree of cracking of the raw material hydrocarbon oil and isomerized products occurs, as long as the number of carbon atoms (molecular weight) of the product is maintained within a predetermined range that permits the formation of the target base oil, the cracked products may also be constituents of the base oil.

Although a preferred embodiment of the present invention was described above, the present invention is not limited to the above-described embodiment.

EXAMPLES

Although the present invention will now be described more specifically based on the following Examples, the present invention is not limited to the Examples.

Production Example 1

Preparation of Hydroisomerization Catalyst A-1

<Zeolite ZSM-22 Production>

Zeolite ZSM-22 containing an organic template, having a Si/Al ratio of 45, and formed from crystalline aluminosilicate was synthesized based on the following procedure. Hereinafter, zeolite ZSM-22 is referred to as "ZSM-22."

First, the following four types of aqueous solution were prepared.

Solution A: Solution in which 1.94 g of potassium hydroxide was dissolved in 6.75 mL of ion-exchanged water.

Solution B: Solution in which 1.33 g of aluminum sulfate 18-hydrate was dissolved in 5 mL of ion-exchanged water.

Solution C: Solution in which 4.18 g of 1,6-hexanediamine (organic template) was diluted with 32.5 mL of ion-exchanged water.

Solution D: Solution in which 18 g of colloidal silica (Ludox AS-40, manufactured by Grace Davison) was diluted with 31 mL of ion-exchanged water.

Next, solution A was added into solution B, and stirring was carried out until the aluminum component was completely dissolved.

Solution C was added into the mixed solution, and then while vigorously stirring at room temperature, the mixture of solutions A, B, and C was injected into solution D. In addition, as a "seed crystal" for promoting crystallization, 0.25 g of a separately-synthesized ZSM-22 powder that had not undergone any special treatments after being synthesized was added to the mixture to obtain a gel-like product.

The gel-like product obtained by the above operation was transferred into a stainless steel autoclave reactor with an internal volume of 120 mL, and hydrothermal synthesis reaction was carried out in a 150° C. oven for 60 hours by rotating the autoclave reactor on a tumbling apparatus at a rotational speed of about 60 rpm. After the reaction was finished, the reactor was cooled, and then opened. The product was dried overnight in a 60° C. dryer to obtain ZSM-22 having a Si/Al ratio of 45.

<Ion Exchange of ZSM-22 Containing an Organic Template>

An ion-exchange treatment was carried out on the thus-obtained ZSM-22 with an aqueous solution containing ammonium ions by the following operation.

The thus-obtained ZSM-22 was placed in a flask. 100 mL of 0.5 N aqueous ammonium chloride per 1 g of zeolite ZSM-22 was added, and the resultant mixture was heated under reflux for 6 hours. The mixture was cooled to room temperature, the supernatant was then removed, and the crystalline aluminosilicate was washed with ion-exchanged water. The same amount as above of 0.5 N aqueous ammonium chloride was again added, and the resultant mixture was heated under reflux for 12 hours.

Subsequently, the solid content was collected by filtration, washed with ion-exchanged water, and dried overnight in a 60° C. dryer to obtain ion-exchanged $NH_4$-type ZSM-22. This ZSM-22 was an ion-exchanged zeolite in a state that included an organic template.

<Binder Blending, Extruding, and Calcining>

The above-obtained $NH_4$-type ZSM-22 and alumina as a binder were mixed in a mass ratio of 7:3, a small amount of ion-exchanged water was added, and the resultant mixture was kneaded. The obtained viscous fluid was loaded in an extrusion molder, and then extruded into a cylindrical extruded body having a diameter of about 1.6 mm and a length of about 10 mm. The extruded body was heated in a $N_2$ atmosphere for 3 hours at 300° C. to obtain a support precursor.

<Platinum Supporting and Calcining>

An impregnation solution was obtained by dissolving tetraammineplatinum dinitrate $[Pt(NH_3)_4](NO_3)_2$ in ion-exchanged water equivalent to an amount of the water absorption of the support precursor measured in advance. This solution was impregnated into the above-described support precursor by an incipient wetness method and supporting was carried out so that the amount of platinum was 0.3% by mass based on the mass of the ZSM-22 type zeolite. Next, the obtained impregnated product (catalyst precursor) was dried overnight in a 60° C. dryer, and then calcined under an air flow for 3 hours at 400° C. to obtain a hydroisomerization catalyst A-1 containing 0.56% by mass of carbon. The carbon content was measured by "combustion in oxygen gas flow—infrared absorption method". EMIA-920V manufactured by HORIBA, Ltd. was used for the measurement.

In addition, the micropore volume per unit mass of the obtained hydroisomerization catalyst was calculated by the following method. First, to remove moisture adsorbed to the hydroisomerization catalyst, a pre-treatment was carried out for evacuating for 5 hours at 150° C. A nitrogen adsorption measurement was carried out on the pre-treated hydroisomerization catalyst at the temperature of liquid nitrogen (−196° C.) using a BELSORP-max, manufactured by BEL Japan, Inc. Then, the micropore volume (cc/g) per unit mass of the hydroisomerization catalyst was calculated to be 0.055 by analyzing the adsorption isotherm of the measured nitrogen by a t-plot method.

Further, the micropore volume $V_z$ per unit mass of the zeolite contained in the catalyst was calculated to be 0.079 based on the following expression. When the nitrogen adsorption measurement for the alumina used as a binder was carried out in the same manner as described above, it was confirmed that the alumina did not have any micropores.

$V_z=V_c/M_z\times100$

In the expression, $V_c$ represents the micropore volume per unit mass of the hydroisomerization catalyst, and $M_z$ represents the content (% by mass) of zeolite contained in the catalyst.

Production Example 2

Preparation of Hydroisomerization Catalyst A-2

Up to the step for obtaining ZSM-22, the operation was performed in the same manner as Production Example 1, and then the above-obtained ZSM-22 and alumina as a binder were mixed in a mass ratio of 7:3, a small amount of ion-exchanged water was added, and the resultant mixture was kneaded. The obtained viscous fluid was loaded in an extrusion molder, and then extruded into a cylindrical extruded body having a diameter of about 1.6 mm and a length of about 10 mm. The extruded body was heated in an air atmosphere for 3 hours at 400° C. to obtain the extruded body ZSM-22.

<Ion Exchange of Extruded Body ZSM-22>

An ion-exchange treatment was carried out on the thus-obtained extruded body ZSM-22 with an aqueous solution containing ammonium ions by the following operation.

The thus-obtained ZSM-22 was placed in a flask. 100 mL of 0.5 N aqueous ammonium chloride per 1 g of zeolite ZSM-22 was added, and the resultant mixture was heated under reflux for 6 hours. The mixture was cooled to room temperature, the supernatant was then removed, and the crystalline aluminosilicate was washed with ion-exchanged water. The same amount as above of 0.5 N aqueous ammonium chloride was again added, and the resultant mixture was heated under reflux for 12 hours.

Subsequently, the solid content was collected by filtration, washed with ion-exchanged water, and dried overnight in a 60° C. dryer to obtain ion-exchanged $NH_4$-type ZSM-22.

<Platinum Supporting and Calcining>

An impregnation solution was obtained by dissolving tetraammineplatinum dinitrate $[Pt(NH_3)_4](NO_3)_2$ in ion-exchanged water equivalent to an amount of the water absorption of the support precursor measured in advance. This solution was impregnated into the above-described support precursor by an incipient wetness method and supporting was carried out so that the amount of platinum was 0.3% by mass based on the mass of the zeolite ZSM-22. Next, the obtained impregnated product (catalyst precursor) was dried overnight in a 60° C. dryer, and then calcined under an air flow for 3 hours at 400° C. to obtain a hydroisomerization catalyst A-2 containing 0.24% by mass of carbon.

The micropore volume per unit mass of the hydroisomerization catalyst A-2 and the micropore volume per unit mass of the zeolite contained in the catalyst were calculated by the same method as for the hydroisomerization catalyst A-1 to be 0.132 (cc/g) and 0.189 (cc/g), respectively.

Example 1

A slack wax having a boiling point range of 330 to 620° C. in which the content of the fraction having a boiling point range of 520 to 620° C. was 20% by volume was isomerized and dewaxed under conditions of an isomerization reaction temperature of 322° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-1 was used. Further, the reaction temperature is a temperature at which the conversion rate was essentially 100%. In the produced oil, the content of the fraction having a boiling point range of 520 to 620° C., which is the main target fraction, was 15% by volume (the yield of this fraction in the slack wax was 80%).

Example 2

A slack wax having a boiling point range of 330 to 520° C. in which the content of the fraction having a boiling point range of 470 to 520° C. was 40% by volume was isomerized and dewaxed under conditions of an isomerization reaction temperature of 325° C., a hydrogen pressure of 15 MPa, a hydrogen/oil ratio of 500 NL/L, and a liquid hourly space velocity of 1.5 For the hydroisomerization catalyst, the hydroisomerization catalyst A-1 was used. Further, the reaction temperature is a temperature at which the conversion rate was essentially 100%. In the produced oil, the yield of the fraction having a boiling point range of 470 to 520° C., which is the main target fraction, was 32% by volume (the yield of this fraction in the slack wax was 80%).

Example 3

An FT synthetic wax having a boiling point range of 330 to 620° C. in which the content of the fraction having a boiling point range of 520 to 620° C. was 60% by volume was isomerized and dewaxed under conditions of an isomerization reaction temperature of 333° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-1 was used. Further, the reaction temperature is a temperature at which the conversion rate was essentially 100%. In the produced oil, the yield of the fraction having a boiling point range of 520 to 620° C., which is the main target fraction, was 46% by volume (the yield of this fraction in the FT synthetic wax was 77%).

Example 4

An FT synthetic wax having a boiling point range of 330 to 520° C. in which the content of the fraction having a boiling point range of 470 to 520° C. was 15% by volume was isomerized and dewaxed under conditions of an isomerization reaction temperature of 320° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-1 was used. Further, the reaction temperature is a temperature at which the conversion rate was essentially 100%. In the produced oil, the yield of the fraction having a boiling point range of 470 to 520° C., which is the main target fraction, was 12% by volume (the yield of this fraction in the FT synthetic wax was 80%).

Comparative Example 1

A slack wax having a boiling point range of 330 to 620° C. in which the content of the fraction having a boiling point range of 520 to 620° C. was 20% by volume was isomerized and dewaxed at an isomerization reaction temperature of 332° C., a hydrogen pressure of 15 MPa, a hydrogen/oil ratio of 500 NL/L, and a liquid hourly space velocity of 1.5 For the hydroisomerization catalyst, the hydroisomerization catalyst A-2 was used. Further, the reaction temperature is a temperature at which the conversion rate was essentially 100%. In the produced oil, the yield of the fraction having a boiling point range of 520 to 620° C., which is the main target fraction, was 13% by volume (the yield of this fraction in the slack wax was 65%).

Comparative Example 2

A slack wax having a boiling point range of 330 to 520° C. in which the content of the fraction having a boiling point range of 470 to 520° C. was 40% by volume was isomerized and dewaxed at an isomerization reaction temperature of 334° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-2 was used. In the product, the yield of the fraction having a boiling point range of 470 to 520° C., which is the main target fraction, was 27% by volume (the yield of this fraction in the slack wax was 68%).

Comparative Example 3

A slack wax having a boiling point range of 520 to 620° C. was isomerized and dewaxed at an isomerization reaction temperature of 342° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-2 was used. Further, the reaction temperature is a temperature at which the conversion rate was essentially 100%. In the produced oil, the yield of the fraction having a boiling point range of 520 to 620° C., which is the main target fraction, was 50% by volume.

Comparative Example 4

A slack wax having a boiling point range of 470 to 520° C. was isomerized and dewaxed at an isomerization reaction temperature of 335° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-2 was used. Further, the reaction temperature is a temperature at which the conversion rate was essentially 100%. In the produced oil, the yield of the fraction having a boiling point range of 470 to 520° C., which is the main target fraction, was 52% by volume.

Comparative Example 5

An FT synthetic wax having a boiling point range of 330 to 620° C. in which the content of the fraction having a boiling point range of 520 to 620° C. was 60% by volume was isomerized and dewaxed at an isomerization reaction temperature of 342° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-2 was used. Further, the reaction temperature is a temperature at which the conversion rate was essentially 100%. In the produced oil, the yield of the fraction having a boiling point range of 520 to 620° C., which is the main target fraction, was 38% by volume (the yield of this fraction in the FT synthetic wax was 63%).

Comparative Example 6

An FT synthetic wax having a boiling point range of 330 to 520° C. in which the content of the fraction having a boiling point range of 470 to 520° C. was 15% by volume was isomerized and dewaxed at an isomerization reaction temperature of 328° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-2 was used. In the produced oil, the yield of the fraction having a boiling point range of 470 to 520° C., which is the main target fraction, was 10% by volume (the yield of this fraction in the FT synthetic wax was 67%).

Comparative Example 7

An FT synthetic wax having a boiling point range of 520 to 620° C. was isomerized and dewaxed at an isomerization reaction temperature of 345° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-2 was used. Further, the reaction temperature is a temperature at which the conversion rate was essentially 100%. In the produced oil, the yield of the fraction having a boiling point range of 520 to 620° C., which is the main target fraction, was 48% by volume.

Comparative Example 8

An FT synthetic wax having a boiling point range of 470 to 520° C. was isomerized and dewaxed at an isomerization reaction temperature of 330° C., a hydrogen pressure of 15 MPa, a hydrogen/oil ratio of 500 NL/L, and a liquid hourly space velocity of 1.5 h$^{-1}$. For the hydroisomerization catalyst, the hydroisomerization catalyst A-2 was used. Further, the reaction temperature is a temperature at which the conversion rate was essentially 100%. In the produced oil, the yield of the fraction having a boiling point range of 470 to 520° C., which is the main target fraction, was 50% by volume.

It was confirmed that Examples 1 to 4, in which an isomerization and dewaxing treatment was performed on a hydrocarbon oil containing a main target fraction and a fraction that is lighter than the main target fraction using a catalyst having a predetermined nature, obtained the main target fraction at a higher yield than Comparative Examples 1 to 8, in which an isomerization and dewaxing treatment was performed without using a predetermined catalyst, or was performed on a main target fraction and a lighter fraction that had been fractionated in advance.

The invention claimed is:

1. A method for producing a lubricant base oil that has a predetermined boiling point range, the method comprising:
a first step of, in the presence of hydrogen, bringing a feedstock containing a first hydrocarbon oil having a boiling point in the predetermined boiling point range and a second hydrocarbon oil having a lower boiling point than the predetermined boiling point range into contact with a hydroisomerization catalyst,
wherein the catalyst contains a support that includes a zeolite having a one-dimensional porous structure including a 10-membered ring and a binder, and platinum and/or palladium supported on the support,
a carbon content of the catalyst is 0.4 to 3.5% by mass,
a micropore volume per unit mass of the catalyst is 0.02 to 0.12 cc/g,
the zeolite is derived from an ion-exchanged zeolite obtained by ion-exchanging an organic template-containing zeolite that contains an organic template and has a one-dimensional porous structure including a 10-membered ring in a solution containing ammonium ions and/or protons, and
a micropore volume per unit mass of the zeolite contained in the catalyst is 0.01 to 0.12 cc/g.

2. The method according to claim 1, wherein a content of the first hydrocarbon oil in the feedstock is 5 to 60% by volume based on a total amount of feedstock.

3. The method according to claim 1, wherein the first hydrocarbon oil has a boiling point of at least 520° C. and the second hydrocarbon oil has a boiling point range of 330° C. to less than 520° C.

4. The method according to claim 1, wherein the first hydrocarbon oil has a boing point range of 470° C. to less than 520° C. and the second hydrocarbon oil has a boiling point range of 330° C. to less than 470° C.

5. The method according to claim 1, further comprising a second step of obtaining a hydrorefined oil by hydrorefining a dewaxed oil obtained in the first step, and a third step of fractionating a base oil fraction having the boiling point range from the hydrorefined oil.

* * * * *

UNITED STATES PATENT AND TRADEMARK OFFICE
CERTIFICATE OF CORRECTION

PATENT NO. : 9,677,012 B2
APPLICATION NO. : 14/388548
DATED : June 13, 2017
INVENTOR(S) : M. Iwama et al.

Page 1 of 1

It is certified that error appears in the above-identified patent and that said Letters Patent is hereby corrected as shown below:

In the Claims

Column 20, Line 38 (Claim 4, Line 2) please change "boing point" to --boiling point--

Signed and Sealed this
Fifteenth Day of May, 2018

Andrei Iancu
*Director of the United States Patent and Trademark Office*